M. G. ADAMS.
FLYING MACHINE.
APPLICATION FILED APR. 19, 1909.
1,003,858.
Patented Sept. 19, 1911.
3 SHEETS—SHEET 2.
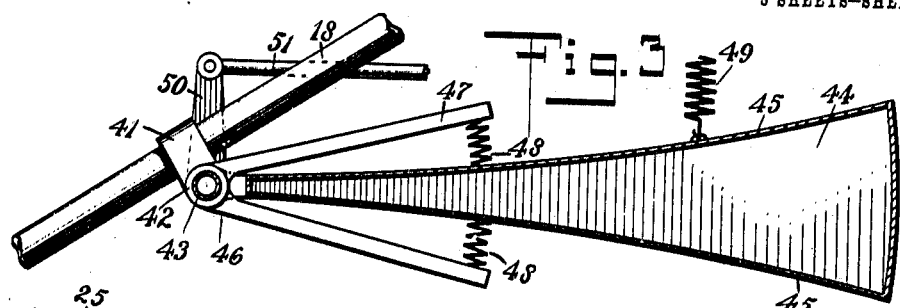
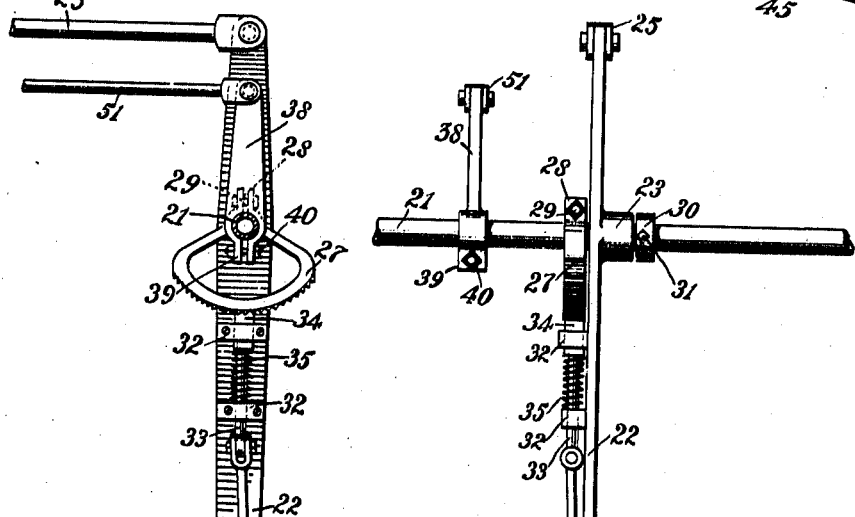
WITNESSES
INVENTOR
Malcolm G Adams
BY
ATTORNEYS

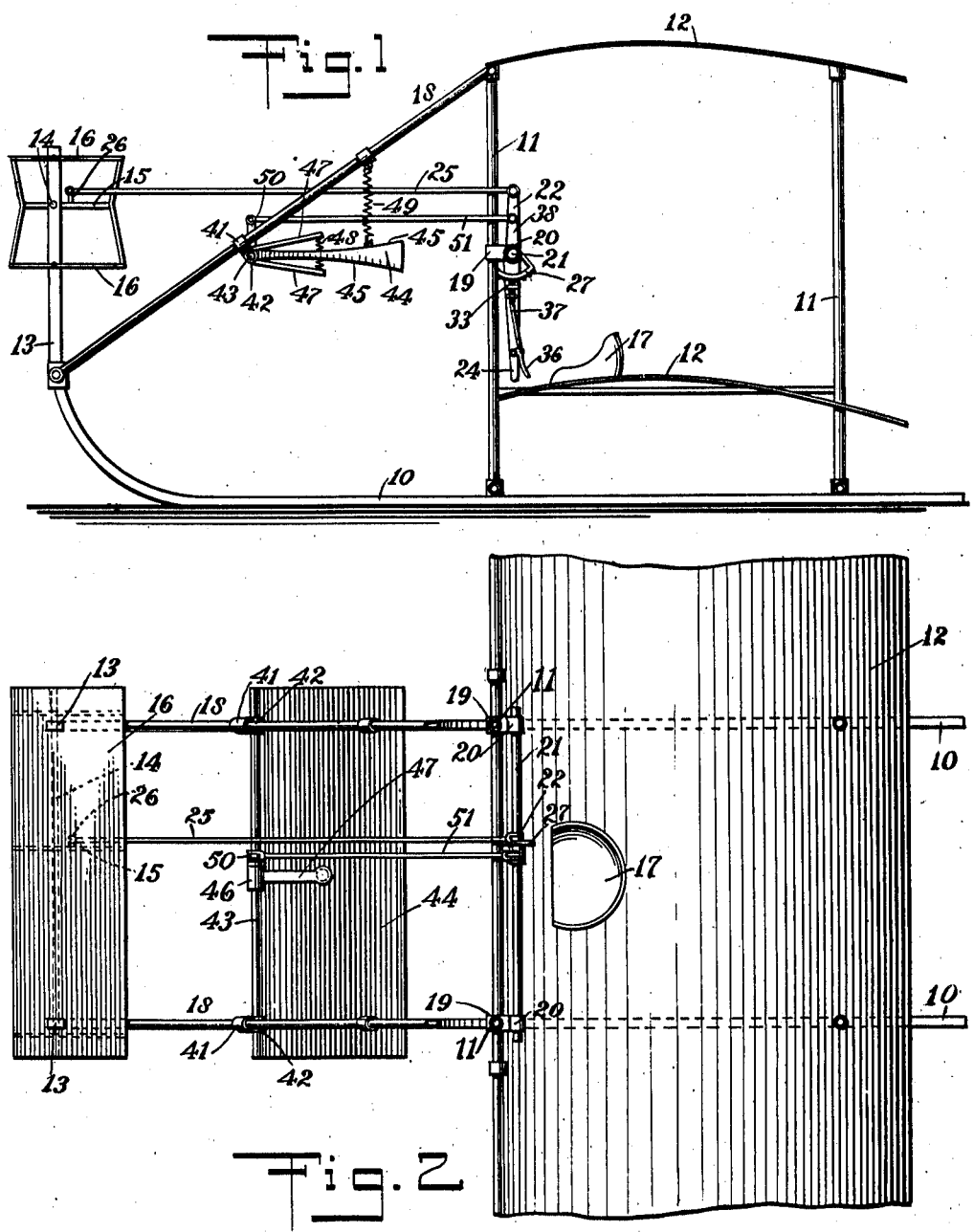

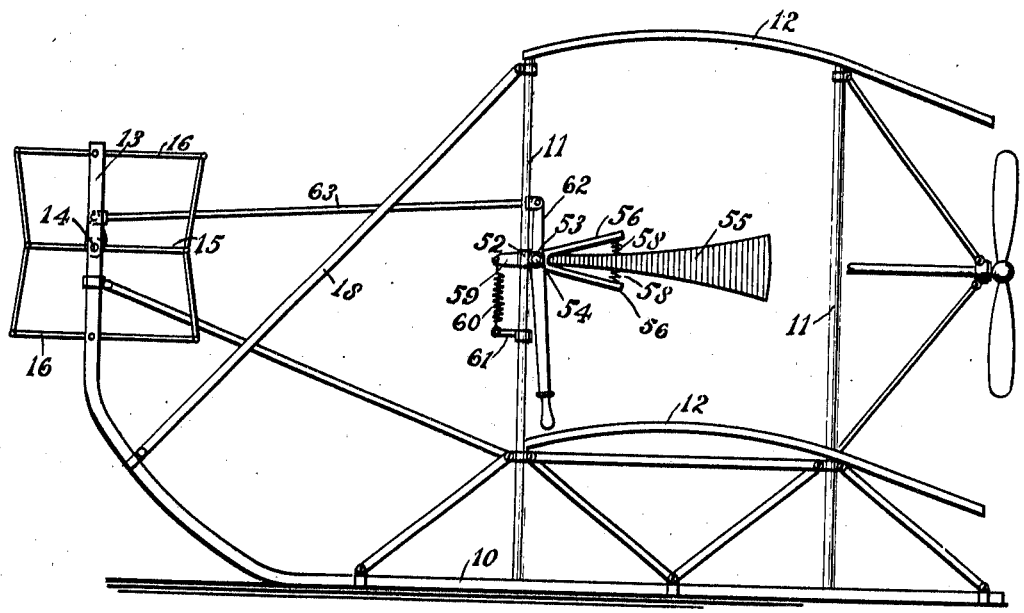
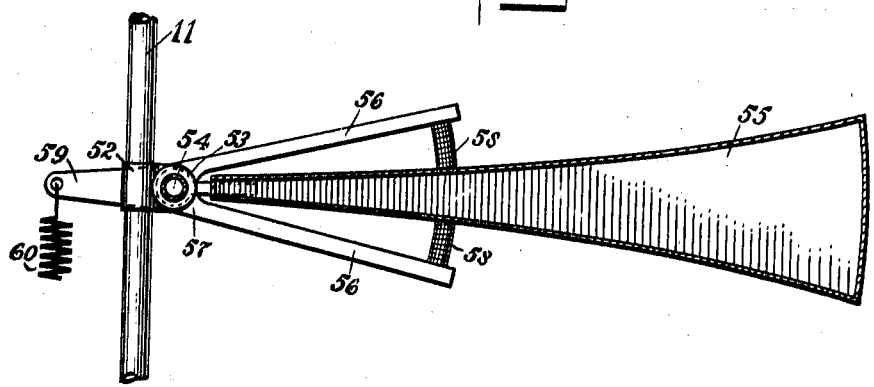

UNITED STATES PATENT OFFICE.

MALCOLM GROVER ADAMS, OF PARSONS, KANSAS.

FLYING-MACHINE.

1,003,858.   Specification of Letters Patent.   Patented Sept. 19, 1911.

Application filed April 19, 1909. Serial No. 490,663.

*To all whom it may concern:*

Be it known that I, MALCOLM GROVER ADAMS, a citizen of the United States, and a resident of Parsons, in the county of Labette and State of Kansas, have invented a new and Improved Flying-Machine, of which the following is a full, clear, and exact description.

This invention relates to flying machines, and more particularly to a machine of this kind in which a steering surface, such as a rudder which is manually or otherwise operable, is controlled by a further surface which is free to move under the influence of air pressure thereagainst.

An object of the invention is to provide a simple and efficient airship in which the stability in flight of the machine is automatically controlled.

A further object of the invention is to provide a machine of the class described, in which a surface normally free to move controls a steering surface, so that if the machine executes an irregular movement the pressure of the wind or air against the unbalanced surface operates the same, in turn to operate the steering surface to return the airship to its course or to reëstablish its fore and aft or other stability.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of part of an airship having an embodiment of my invention applied thereto; Fig. 2 is a plan view of the same; Fig. 3 is an enlarged, longitudinal section of the controlling surface, showing means for attaching it to the airship; Fig. 4 is an enlarged side elevation of a manually operable steering device, showing a part in cross section; Fig. 5 is an enlarged rear elevation of the device shown in Fig. 4; Fig. 6 is a side elevation of part of a flying machine showing a modified form of my invention applied thereto; and Fig. 7 is a longitudinal section of the controlling surface of the modified form.

Before proceeding to a more detailed explanation of my invention, it should be clearly understood that the same is preferably employed in connection with aeroplane or heavier-than-air types of flying machines, though it can also be advantageously used with other kinds of airships, for example, in connection with machines which embody combinations of heavier-than-air and lighter-than-air types. I have illustrated for example, in the accompanying drawings, a heavier-than-air flying machine of a type similar to that of O. and W. Wright as disclosed in their Patent Serial No. 821,393, of May 22, 1906, and two types of my invention have been shown applied to this form of machine in different ways. Needless to say, I do not limit myself to the details of construction shown for example, for these details can be varied with individual preference and special conditions.

I employ an unbalanced surface or plane, that is, a surface free to move under the influence of air pressure, to control a rudder or steering surface. The latter may be of any kind and may be used for directing the flying machine either upward and downward or to one side or the other. The unbalanced surface tends resiliently to maintain a normal position when the machine is traveling, without deviating from the line of flight. As soon however, as the machine executes an uncontrolled movement up or down or to one side or the other, as the case may be, the resulting air pressure against the freely movable or unbalanced surface operates the latter so that it in turn, operates the controlling surface or rudder, to return the machine to its course.

Referring more particularly to the drawings, (Figs. 1 to 5), the flying machine has skids or runners 10 upon which it rests when upon the ground. Uprights 11 are mounted upon the skids and carry the superposed supporting surfaces or planes 12. The skids have the forward ends 13 which are arranged at substantial distances in front of the aeroplane, upwardly disposed and substantially vertical in the normal position of the machine. A shaft 14 is rotatably carried by the parts 13 of the skids, and has rigid therewith the frame 15 of the steering surfaces 16 which constitute the rudder. This rudder regulates the upward and downward movements of the machine and is also used to control the fore and aft stability of the machine in flight.

The machine is driven by a suitable engine and propellers, or in any other convenient manner, and has a seat 17 for the operator. This seat is preferably located above the lower plane 12, and necessarily, at a point remote from the rudder 16. Struts 18 connect the forward ends of the skids and the upper ends of the uprights 11, to brace the framework of the aeroplane. These struts are at an angle as is shown most clearly in Fig. 1. The uprights 11 have rigidly secured thereon, brackets 19 provided with bearings 20 in which is journaled a shaft 21. A controlling lever 22 has a hub 23 by means of which it is loosely mounted upon the shaft 21, and at the lower end has a grip 24 by means of which it can be manually controlled. A link 25 pivotally connected with the upper end of the lever and with a stud 26 rigid with the frame of the rudder, operatively connects the latter and the lever. A notched segment 27 is mounted upon the shaft 21 at one side of the lever and has wings 28, connected by means of a bolt 29 so that it can be rigidly clamped upon the shaft. A collar 30 having a set screw 31 is rigidly fastened upon the shaft 21 at the other side of the lever, and with the segment prevents the movement of the lever longitudinally of the shaft. Upon the lever are guides 32 having openings therethrough. A slidable member 33 having a notched head 34 is arranged to move in the guides 32, and carries a spring 35 which engages one of the guides and the head 34 to force the latter normally into engagement with the segment. A rocking handle 36 is pivoted upon the lever near the grip 24, and is connected by means of a link 37 with the member 33, so that the latter can be controlled from the lower end of the lever.

An arm 38 is mounted upon the shaft 21 and has wings 39 connected by a bolt 40 so that the arm can be rigidly secured in place, for a purpose which will appear more clearly hereinafter.

Upon the struts 18 are mounted brackets 41 having bearings 42 in which is journaled a shaft 43. The latter carries the controlling surface or member 44 which is preferably hollow and of wedge shape, as is shown most clearly in Fig. 3, the opposite surfaces or faces 45 of the member being concave. The member or surface 44 is movably mounted upon the shaft and is arranged between the sides 47 of bifurcated arms 46 rigid with the shaft. Springs 48 are arranged between the sides 47 and the member. Holding springs 49 connect the surface and the struts and hold the surface in a normal position against the action of gravity. The shaft 43 has an arm 50 rigid therewith and connected with the arm 38 by means of a rod 51 having the respective ends pivotally secured at the arms 38 and 50.

The provision of the loose lever 22 and the means for operatively connecting it with the shaft 21 through the agency of the member 33 and the segment 27, permits the rudder to be disconnected with respect to the controlling surface, when the rocking handle is operated to retract the sliding member from engagement with the segment 27. When this is the case, the shaft 43 can move freely when the controlling surface is swung up or down, without correspondingly operating the rudder, which is then controlled by the manual operation alone, of the lever 22. When however, the sliding member 33 is in engagement with the segment, a sudden and uncontrolled upward or downward movement of the airship causes a corresponding upward or downward movement of the controlling surface and this movement is transmitted resiliently through the springs 48 and the sides 47, to the shaft 43. The rocking movement of the latter is transmitted through the arm 50, the link 51 and the arm 38, to the shaft 21. The rocking movement of the latter in turn, through the rigid segment 27, the lever 22, and the link 25, is transmitted to the rudder, and the latter is so inclined that the pressure of the air thereagainst tends to return the airship to its normal direction of flight. Correspondingly, an uncontrolled downward plunge is offset by a downward movement of the controlling surface. The arrangement and proportions of the parts are such that a comparatively slight movement of the controlling surface effects a materially greater movement of the rudder. The action of the controlling device is automatic and is substantially instantaneous as well as positive, in its results. Owing to the provision of the adjustable connection between the actuating lever 22 and the shaft 21, the relative positions of the rudder and of the controlling surface can be adjusted or varied as necessary. Thus, in flying on the level, if the controlling surface tends to hold the front rudder at too great a positive angle, thus raising the elevation of the machine, the lever 22 can be adjusted by moving it backward till the machine travels in a horizontal direction, when the lever 22 is again operatively connected with the shaft 21, it having been released during the adjustment. The adjustment can of course, be reversed if necessary. The tendency of the controlling plane is to remain horizontal, owing to the wind pressure on each side of it.

In Figs. 6 and 7 I have illustrated a modified form of my invention in which I provide brackets 52 upon the uprights 11. The brackets 52 have bearings 53 in which is journaled a shaft 54. A controlling surface 55 is arranged to swing upon the shaft 54 and lies between the sides 56 of bifurcated arms 57 rigid with the shaft. Springs 58 are positioned between the sides 56 and the surface. The latter has an arm 59 rigid therewith and connected by means of a spring 60 with an arm 61 mounted upon one of the uprights 11. The shaft 54 has a rigid arm 62 connected by means of a link 63 with the rudder frame 15. This form of the device is comparatively simple and does not include the releasing and adjusting mechanism.

One or more of the controlling surfaces can be employed if so desired. In Fig. 2 is shown an arrangement in which a single surface is used. If so desired, however, especially in the form of the device shown in Fig. 6, two surfaces can be employed, one at each side of the machine; if necessary, a number greater than two can also be used.

Having thus described my invention, I claim as new, and desire to secure by Letters Patent:

1. In a flying machine, a rudder, a controlling surface free to move under wind pressure, and means for operating the rudder from said controlling surface, the said means being connected with the rudder and resiliently connected with said controlling surface.

2. In a flying machine, a steering surface, a controlling surface mounted to swing, a means for resiliently holding said controlling surface in normal position, and an operative cushioned connection between said surfaces.

3. In a flying machine, a rudder, a link connected with the rudder, a controlling surface resiliently held in a normal position and operable by wind pressure, and an operative cushioned connection between said link and said controlling surface.

4. In a flying machine a balanced surface, a surface free to move under the influence of air pressure, means for holding said surface in a normal position, and an operative cushioned connection between said surfaces, whereby the latter controls the former.

5. In a flying machine, a rudder, a surface free to move under the influence of wind pressure, resilient means for resisting the movement of said surface, means for operating said rudder independently of said surface free to move, and an operative connection between said surface and said rudder.

6. In a flying machine, a rudder, a surface free to move under the influence of wind pressure against the same, a device mounted to swing and having members between which extends the said surface, an operative connection between said device and said rudder, a steering lever controlling said rudder, and a spring for holding said surface in a normal position.

7. In a flying machine, a rudder, a surface mounted to swing, a device mounted to swing and having arms between which extends the said surface, the said device being actuated by the movement of the said surface, a spring tending to hold said surface in a normal position, and an operative connection between said device and said rudder.

8. In a flying machine, a steering surface, a controlling surface free to move under the influence of wind pressure, an operative connection between said surfaces, said controlling surface tending resiliently to remain in a normal position, and means for manually operating said steering surface, said connection being cushioned.

9. In a flying machine, a rudder, a controlling surface free to swing and resiliently held in a normal position, a hand lever controlling said rudder, and a releasable connection between said lever and said controlling surface.

10. In a flying machine, a rudder, a controlling surface free to swing, a spring for holding said surface in a normal position, a hand lever controlling said rudder, and an operative, releasable connection between said lever and said surface.

11. In a flying machine, a steering surface, a controlling surface free to swing, a link connected with said surface, a second link connected with said steering surface, a hand lever controlling said second link, and means for operatively and releasably connecting said first link and said lever.

12. In a flying machine, a rudder, a controlling surface free to swing under the influence of wind pressure, a shaft, a hand lever loosely carried by said shaft, a link connecting said lever and said rudder, an arm rigid with said shaft, a link connecting said arm and said surface, and means for releasably and adjustably connecting said lever and said shaft.

13. In a flying machine, a rudder, a controlling surface free to swing and resiliently held in a normal position, a hand lever controlled by said surface, and a link connecting said lever and said rudder.

14. In a flying machine, a rudder, a controlling surface free to move, a shaft, a hand lever loose upon said shaft, a link connecting said lever and said rudder, a toothed member rigid with said shaft, an arm rigid with said shaft, a link connecting said arm and said surface, and a member carried by said lever and adapted to engage said toothed member operatively to connect said toothed member and said lever, said member of said lever being releasable.

15. In a flying machine, a rudder, a controlling surface having a limited freedom of movement, a shaft, a hand lever loose upon said shaft, a link connecting said lever and said rudder, a notched segment rigid with said shaft, an arm rigid with said shaft, a link connecting said arm and said surface, a slidable member mounted upon said lever and adapted to engage said notched segment, a spring tending to force said member normally into engagement with said segment, a rocking handle for releasing said member from engagement with said segment, and a spring tending to hold said surface in a normal position.

16. In a flying machine, a rudder, a movable, bifurcated member, a controlling surface free to move between the sides of said bifurcated member, and an operative connection between said bifurcated member and said rudder.

17. In a flying machine, a rudder, a movable, bifurcated member, a controlling surface free to move between the sides of said bifurcated member, an operative connection between said bifurcated member and said rudder, and springs between said surface and the sides of said bifurcated member.

18. In a flying machine, a rudder, a movable, bifurcated member, a controlling surface free to swing between the sides of said member, an operative connection between said bifurcated member and said rudder, springs between said surface and the sides of said member, and a further spring tending to hold said surface in a normal position.

19. In a flying machine, a steering surface, a controlling surface free to swing, and a movable member resiliently connected with said controlling surface and operatively connected with said steering surface, said controlling surface having a face concave from front to rear.

20. In a flying machine, a steering surface, a controlling surface free to swing, and a movable member resiliently connected with said controlling surface and operatively connected with said steering surface, said controlling surface having the opposite faces concave from front to rear.

21. In a flying machine, a steering surface, a controlling surface free to swing, and a movable member resiliently connected with said controlling surface and operatively connected with said steering surface, said controlling surface being wedge-shaped and having the opposite surfaces concave from front to rear.

22. In a flying machine, a rudder, a shaft, a hand lever loose upon said shaft, a link connecting said lever and said rudder, a second shaft, said shafts having rigid arms, a link connecting said rigid arms, a bifurcated member rigid with said second shaft, a controlling surface free to swing with respect to said second shaft and positioned between the sides of said bifurcated member, springs between the sides of said bifurcated member and said surface, a further spring serving to hold said surface in a normal position, and means for releasably connecting said first shaft and said lever.

23. In a flying machine, a rudder, a shaft, a hand lever loose upon said shaft, a link connecting said lever and said rudder, a second shaft, said shafts having rigid arms, a link connecting said rigid arms, a bifurcated member rigid with said second shaft, a controlling surface free to swing with respect to said second shaft and positioned between the sides of said bifurcated member, springs between the sides of said bifurcated member and said surface, a further spring serving to hold said surface in a normal position, means for releasably connecting said first shaft and said lever, a notched segment rigid with said first shaft, and a member releasably mounted upon said lever and adapted to engage said notched segment operatively to connect said lever with said notched segment.

24. In a flying machine, a steering surface, and a hollow substantially wedge-shaped controlling surface resiliently held in a normal position, the said controlling surface being free to swing and operatively connected with said steering surface.

25. In a flying machine, a steering surface, a surface free to move under the influence of air pressure, a member mounted to swing and resiliently connected with said last mentioned surface, and an operative connection between said member and the steering surface.

26. In a flying machine, a steering surface, a controlling surface free to move upward or downward under the influence of air pressure, a shaft mounted to rock, an operative connection between the shaft and the steering surface, and means for transmitting resiliently the movement of said controlling surface to said shaft.

27. In a flying machine, a rudder, a controlling surface free to swing, means for resiliently holding said surface in a normal position, a shaft adapted to be rocked by said controlling surface, and an operative connection between said shaft and said rudder.

28. In a flying machine, a rudder, a controlling surface free to swing, a shaft mounted to rock, a member rigid with said shaft, a resilient connection between said member and said controlling surface, and an operative connection between the shaft and said rudder.

29. In a flying machine, a rudder, a shaft mounted to rock, a member rigid with said shaft and having diverging arms, a controlling surface free to swing on said shaft, and extending between said arms, springs between the said arms and the said controlling surface, a spring for holding said surface in a normal position, an arm rigid on said shaft, and an operative connection between said arm and said rudder.

30. In a flying machine, a steering surface, a surface for controlling the steering surface, a movable member on which the controlling surface is mounted to swing, the said controlling surface being free to move under air pressure, and an operative cushioned connection between the said surfaces and including the said movable member.

31. In a flying machine, a balancing apparatus comprising a movable plane, springs to maintain the plane balanced under normal conditions, a rudder and mechanism controlled by the movement of the plane to actuate the rudder.

In testimony whereof, I have signed my name to this specification in the presence of two subscribing witnesses.

MALCOLM GROVER ADAMS.

Witnesses:
  LEILA L. WILSON,
  IRA F. ADAMS.